United States Patent
Abdallah et al.

(10) Patent No.: US 12,358,167 B1
(45) Date of Patent: Jul. 15, 2025

(54) COMPLIANCE MECHANISM WITH GRAVITY SELF-CENTERING

(71) Applicant: GM GLOBAL TECHNOLOGY OPERATIONS LLC, Detroit, MI (US)

(72) Inventors: Muhammad E. Abdallah, Farmington Hills, MI (US); Dooil Hwang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/746,922

(22) Filed: Jun. 18, 2024

(51) Int. Cl.
  *B25J 17/02* (2006.01)
  *B25J 9/16* (2006.01)
  *B25J 15/00* (2006.01)

(52) U.S. Cl.
  CPC ......... *B25J 17/0208* (2013.01); *B25J 9/1697* (2013.01); *B25J 15/0066* (2013.01); *B25J 17/0241* (2013.01)

(58) Field of Classification Search
  CPC ............. B25J 17/0208; B25J 17/0225; B25J 17/0233; B25J 17/0241; B25J 19/063; B25J 17/0258; B23Q 3/183
  See application file for complete search history.

(56) References Cited

U.S. PATENT DOCUMENTS 11,364,642 B2 * 6/2022 Huang ..................... B25J 17/00

* cited by examiner

*Primary Examiner* — Gregory Robert Weber

(74) *Attorney, Agent, or Firm* — CANTOR COLBURN LLP

(57) ABSTRACT

An end effector support for a system includes a first compliance mechanism, including two base rails. A first base rail is offset from a second base rail in a first direction of movement of the end effector. Each base rail has an identical curvilinear profile. The support includes two compliance rails, each operably connected to a respective base rail of the two base rails. A plurality of rolling elements are positioned between each base rail and each compliance rail to operably connect the base rail to the compliance rail. A position sensor is located at the first compliance mechanism to detect a position of the compliance rails relative to the respective base rails. Each compliance rail is configured to be pivotably connected to the end effector symmetrically to allow for movement of the end effector in the first direction of movement.

20 Claims, 3 Drawing Sheets

COMPLIANCE MECHANISM WITH GRAVITY SELF-CENTERING

INTRODUCTION

The subject disclosure relates to robotic systems, and in particular to supports for arms of robotic systems.

Robotic systems, or other actuated manipulation systems, utilize arms having end-effectors that allow for interaction with, for example, humans in collaborative applications, or machines in moving-line applications. Such arms often include supports with compliance mechanisms that enable physical interaction with and movement the surrounding environment with low impedance, and thus low applied force to perform the movement, with multiple degrees of freedom. The compliance mechanism can be a four-bar parallelogram configuration, or similar. Such configurations, however, have limitations in that they are often large and lack a self-centering feature leading to cumbersome operation of the mechanism.

SUMMARY

In one exemplary embodiment, an end effector support for a system includes a first compliance mechanism, including two base rails, a first base rail of the two base rails offset from a second base rail of the two base rails in a first direction of movement of an end effector. Each base rail has a curvilinear profile. The support includes two compliance rails. Each compliance rail is operably connected to a respective base rail of the two base rails. Each compliance rail has a complimentary curvilinear profile to each of the base rails. A plurality of rolling elements are positioned between each base rail and each compliance rail to operably connect the base rail to the compliance rail. A position sensor is located at the first compliance mechanism to detect a position of the compliance rails relative to the respective base rails. Each compliance rail is configured to be pivotably connected to the end effector symmetrically to allow for movement of the end effector in the first direction of movement.

In addition to one or more of the features described herein the support includes a base plate to which the two base rails are secured.

In addition to one or more of the features described herein the two base rails are configured such that the end effector returns to a neutral position relative to the first direction of movement under gravity.

In addition to one or more of the features described herein the two compliance rails are positioned vertically below the two base rails.

In addition to one or more of the features described herein a lock mechanism selectably locks the position of the compliance rails relative to the respective base rails.

In addition to one or more of the features described herein the position sensor is one of a rotary sensor detecting the rotation of a pivot joint connecting the end-effector to the base rail or a linear sensor detecting the relative motion of the compliance rail with respect to the base rail.

In addition to one or more of the features described herein the support includes a second compliance mechanism having two upper rails. A first upper rail of the two upper rails is offset from a second upper rail of the two upper rails in a second direction of movement of the end effector. Each upper rail has an identical curvilinear profile. The second compliance mechanism further includes two lower rails. Each lower rail operably is connected to a respective base rail of the two upper rails. Each lower rail has a complimentary curvilinear profile to each of the upper rails. A plurality of rolling elements are positioned between each upper rail and each lower rail to operably connect the upper rail to the lower rail. Each lower rail is pivotably connected to first compliance mechanism to allow for movement of the end effector in the second direction of movement. A second position sensor is located at the second compliance mechanism to detect a position of the lower rails relative to the respective upper rails.

In addition to one or more of the features described herein the second compliance mechanism is positioned vertically above the first compliance mechanism.

In addition to one or more of the features described herein the second direction of movement is perpendicular to the first direction of movement.

In addition to one or more of the features described herein the two upper rails are configured such that the end effector returns to a neutral position relative to the second direction of movement under gravity.

In another exemplary embodiment, a robotic system includes a robot, an end effector operably connected to the robot, and an end effector support operably connecting the end effector to the robot. The end effector support includes a first compliance mechanism, including two base rails. A first base rail of the two base rails is offset from a second base rail of the two base rails in a first direction of movement of the end effector. Each base rail has an identical curvilinear profile. The support further includes two compliance rails. Each compliance rail is operably connected to a respective base rail of the two base rails. Each compliance rail has a complimentary curvilinear profile to each of the base rails. A plurality of rolling elements are positioned between each base rail and each compliance rail to operably connect the base rail to the compliance rail. A position sensor is located at the first compliance mechanism to detect a position of the compliance rails relative to the respective base rails. Each compliance rail is configured to be pivotably connected to the end effector to allow for movement of the end effector in the first direction of movement. A robot position is changed in response to a detected position of the compliance rails relative to the respective base rails.

In addition to one or more of the features described herein the two base rails are configured such that the end effector returns to a neutral position relative to the first direction of movement under gravity.

In addition to one or more of the features described herein the two compliance rails are positioned vertically below the two base rails.

In addition to one or more of the features described herein a lock mechanism selectably locks the position of the compliance rails relative to the respective base rails.

In addition to one or more of the features described herein the position sensor is one of a rotary sensor detecting the rotation of a pivot joint connecting the end-effector to the base rail or a linear sensor detecting the relative motion of the compliance rail with respect to the base rail.

In addition to one or more of the features described herein a second compliance mechanism includes two upper rails. A first upper rail of the two upper rails is offset from a second upper rail of the two upper rails in a second direction of movement of the end effector. Each upper rail has an identical curvilinear profile. The support further includes two lower rails. Each lower rail is operably connected to a respective base rail of the two upper rails. Each lower rail has a complimentary curvilinear profile to each of the upper rails. A plurality of rolling elements are positioned between each upper rail and each lower rail to operably connect the upper rail to the lower rail. A second position sensor is located at the second compliance mechanism to detect a position of the lower rails relative to the respective upper rails. Each lower rail is pivotably connected to first compliance mechanism to allow for movement of the end effector in the second direction of movement.

In addition to one or more of the features described herein the second compliance mechanism is positioned vertically above the first compliance mechanism.

In addition to one or more of the features described herein the second direction of movement is perpendicular to the first direction of movement.

In addition to one or more of the features described herein the two upper rails are configured such that the end effector returns to a neutral position relative to the second direction of movement under gravity.

In addition to one or more of the features described herein the end effector is one of a pointer, a sensor probe, a gripper tool, and a welding tool.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
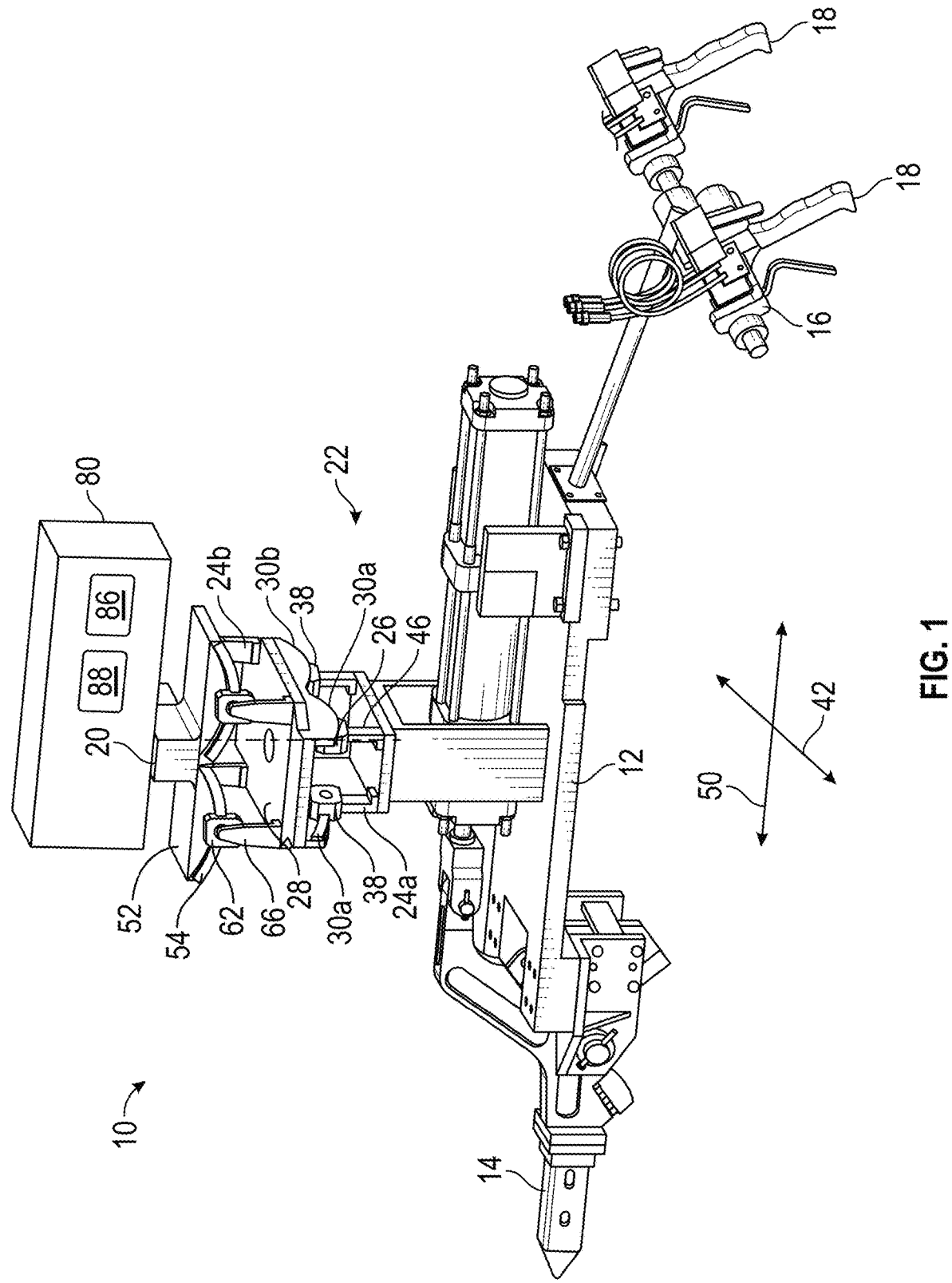
FIG. 1 is a perspective view of an embodiment of a robotic system.

The following description is merely exemplary in nature and is not intended to limit the present disclosure, its application or uses. It should be understood that throughout the drawings, corresponding reference numerals indicate like or corresponding parts and features.

In accordance with an exemplary embodiment, illustrated in FIG. 1 is an embodiment of a robotic system 10. The robotic system 10 includes an end effector 12, which is connected to and supports an engagement element 14. In some embodiments, the engagement element 14 is a pointer, a sensor probe, a gripper tool, a welding tool, or the like. It is to be appreciated that these are merely examples of engagement elements 14, and one skilled in the art will readily appreciate that the engagement element 14 may take other forms. The robotic system 10 may further include a user interface 16 connected to the engagement element 14 via the end effector 12 to guide movement or operation of the engagement element 14. In some embodiments, the user interface 16 includes one or more handles 18, triggers, or other controls.

The end-effector 12 is connected to a relatively fixed support 20, and in some embodiments through the support 20 to a robot 80 or other mechanism to drive movement of the end effector 12. This connection is via a compliance assembly 22. In the embodiment of FIG. 1, the compliance assembly 22 includes two compliance mechanisms 24 arranged along a stacking axis 26, with a first compliance mechanism 24a rotationally offset from a second compliance mechanism 24b relative to the stacking axis 26.

Figure 2:
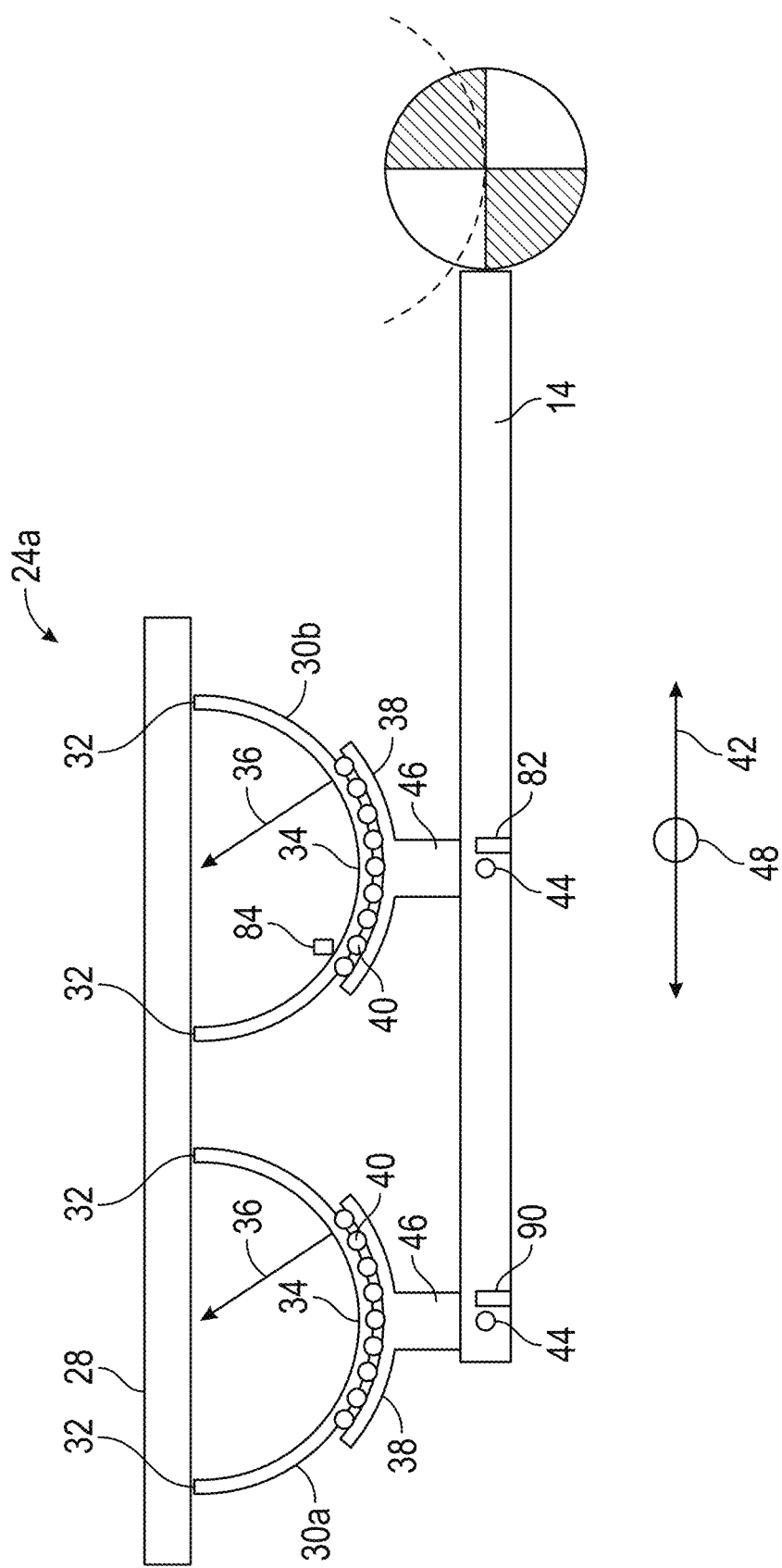
FIG. 2 is a schematic illustration of an embodiment of a first compliance mechanism.

Referring now to FIG. 2 with continued reference to FIG. 1, an embodiment of a compliance mechanism 24 will now be described in greater detail. The first compliance mechanism 24a includes a base plate 28 having two base rails 30a and 30b (also referred to as 30) connected thereto and extending, in some embodiments, vertically below the base plate 28. Each of the base rails 30 is curvilinear and connected to the base plate 28 at end portions 32 of the base rails 30. In some embodiments, the each of the base rails 30 has a constant radius 36, and are arranged such that the end portions 32 are located vertically higher that a middle portion 34 of the base rails 30. In an embodiment, the radiuses of each of the base rails 30 are equal. A first base rail 30a is offset from a second base rail 30b along a first direction of motion 42 of the end effector 12.

A compliance rail 38 is connected to each of the base rails 30, with a plurality of rolling elements 40 disposed between each compliance rail 38 and the respective base rail 30 to facilitate motion of the compliance rails 38 relative to the respective base rails 30. The compliance rails 38 are curvilinear, are radially offset from the base rails 30 to accommodate the plurality of rolling elements 40, and share a common center of curvature. In the arrangement of the first compliance mechanism 24a, each of the compliance rails 38 are connected to the end effector 12 via a pivot arm 46 at a pivot 44. The connection is such that the pivot arm 46 rotates about the pivot 44 relative to the end effector 12 allowing for movement of the end effector 12 in the first direction of motion 42. The position and configuration of the base rails 30 and compliance rails 38, with the middle portion 34 located vertically below the end portions 32 results in, in the absence of another applied force, the end effector 12 returning to a first neutral position 48 relative to the first direction of motion 42 due to gravity. In some embodiments the first compliance mechanism 24a may include a lock 90 disposed at, for example the pivot 44 to selectably lock the position of the first compliance mechanism 24a. The lock may also, for example, be a brake or a clamp that locks the compliance rail 38 to the base rail 30.

Referring again to FIG. 1, in some embodiments the compliance assembly 22 includes a second compliance mechanism 24b stacked atop the first compliance mechanism 24a along the stacking axis 26. The second compliance mechanism 24b allows for and controls movement of the end effector 12 in a second direction of motion 50, which in some embodiments is perpendicular to the first direction of motion 42.

Figure 3:
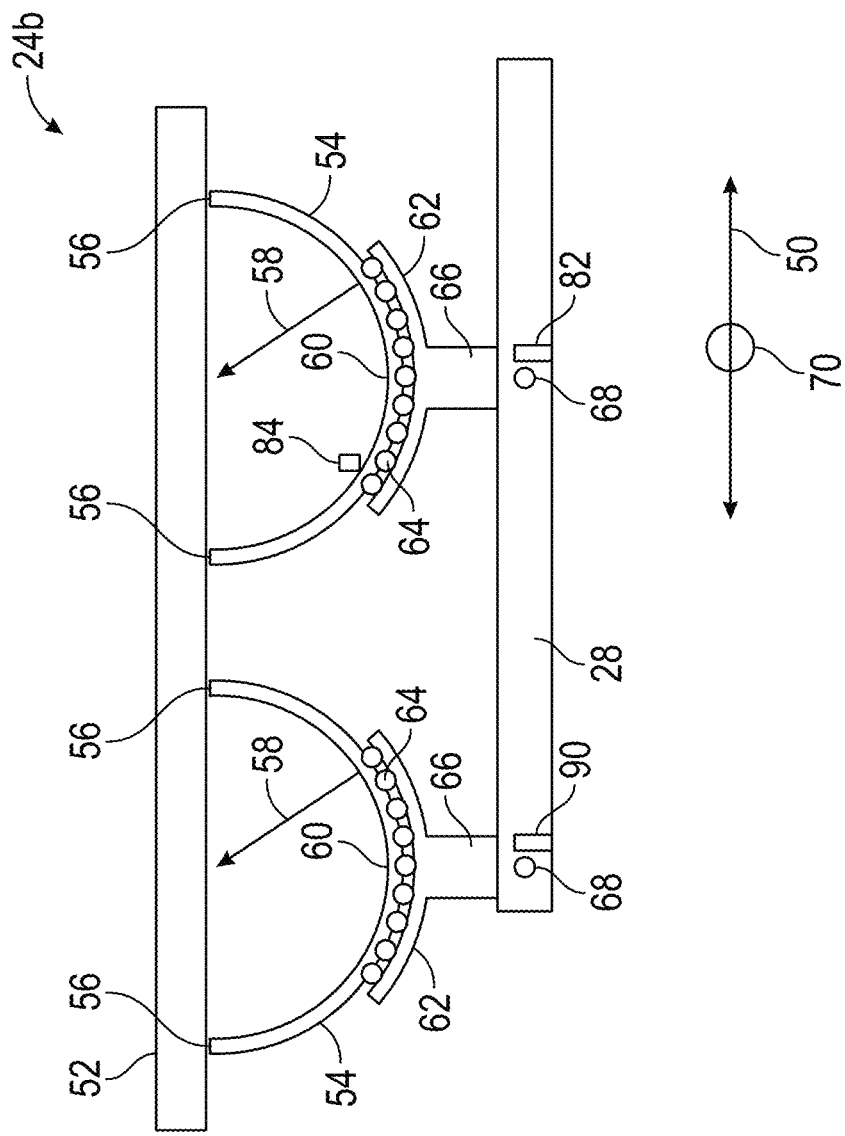
FIG. 3 is a schematic illustration of an embodiment of a second compliance mechanism.

Referring now to FIG. 3, an embodiment of the second compliance mechanism 24b will be described in greater detail. The second compliance mechanism 24b includes an upper plate 52 having two upper rails 54 connected thereto and extending, in some embodiments, vertically below the upper plate 52. Each of the upper rails 54 is curvilinear and connected to the upper plate 52 at end portions 56 of the upper rails 54. In some embodiments, each of the upper rails 54 has a constant radius 58, and are arranged such that the end portions 56 are located vertically higher than a middle portion 60 of the upper rails 54. In an embodiment, the radiuses of each of the upper rails 54 are equal. A first upper rail 54 is offset from a second upper rail 54 along the second direction of motion 50 of the end effector 12.

A lower rail 62 is connected to each of the upper rails 54, with a plurality of rolling elements 64 disposed between each lower rail 62 and the respective upper rail 54 to facilitate motion of the lower rails 62 relative to the respective upper rails 54. The lower rails 62 are curvilinear and are radially offset from the upper rails 54 to accommodate the plurality of rolling elements 64, and share a common center of curvature. In the arrangement of the second compliance mechanism 24b, each of the lower rails 62 are connected to the base plate 28 via an upper pivot arm 66 at an upper pivot 68. The connection is such that the upper pivot arm 66 rotates about the upper pivot 68 relative to the base plate 28 allowing for movement of the base plate 28, and thus the end effector 12 (shown in FIG. 1) in the second direction of motion 50. The position and configuration of the upper rails 54 and the lower rails 62, with the middle portion 60 located vertically below the end portions 56 results in, in the absence of another applied force, the end effector 12 returning to a second neutral position 70 relative to the second direction of motion 50 due to gravity. In some embodiments the first compliance mechanism 24a may include a lock 90 disposed at, for example the pivot 68 to selectably lock the position of the second compliance mechanism 24b. The lock may also, for example, be brake or clamp that locks the compliance rail 38 to the base rail 30.

The compliance assembly 22 utilizing compliance mechanisms 24a and 24b provides translation degrees of freedom of movement of the end effector 12 in the first and second directions of motion 42, 50, or combinations thereof with low impedance or applied force required to effect the movement, while constraining rotational orientation of the end effector 12. Further, the compliance assembly 22 is self-centering, and returns to a neutral, equilibrium position in the absence of other applied forces, using gravity. Additionally, the structure is configured to support a cantilevered end effector 12, meaning that it will support a center of mass offset to a distance without changing the equilibrium position. The self-centering motion under gravity exhibits a constant natural frequency independent of the magnitude of the weight of the end effector 12 and other payloads.

Some embodiments may include one or more position sensors to determine the positions of the compliance mechanisms 24a, 24b. For example, as illustrated in FIG. 2, a rotary sensor 82 may be located at the rotational joint 44 to determine position of the end effector 12 via the position of the rotational joint 44. Additionally or alternatively, the one or more position sensors may include a linear encoder 84 located at the base rail 30 to determine position of the compliance rail 38 relative to the base rail 30. Similarly, one or more sensors 82, 84 may be utilized at the second compliance mechanism 24b, as shown in FIG. 3. As shown in FIG. 1, the compliance assembly 22 is connected to the robot 80, which includes a robot drive 86 and a controller 88. The controller 88 is operably connected to the one or more sensors 82, 84, and receives feedback from the sensors 82, 84 regarding position of the compliance mechanisms 24a, 24b. The controller 88 then may command the robot drive 86 to position the robot 80 in response to the sensed position of the compliance mechanisms 24a, 24b.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

The term "about" is intended to include the degree of error associated with measurement of the particular quantity based upon the equipment available at the time of filing the application. For example, "about" can include a range of ±8% of a given value.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An end effector support for a system, comprising:
a first compliance mechanism, including:
two base rails, a first base rail of the two base rails offset from a second base rail of the two base rails in a first direction of movement of an end effector, each base rail having a curvilinear profile;
two compliance rails, each compliance rail operably connected to a respective base rail of the two base rails, each compliance rail having a complimentary curvilinear profile to each of the base rails; and
a plurality of rolling elements disposed between each base rail and each compliance rail to operably connect the base rail to the compliance rail; and
a position sensor disposed at the first compliance mechanism to detect a position of the compliance rails relative to the respective base rails;
wherein each compliance rail is configured to be pivotably connected to the end effector symmetrically to allow for movement of the end effector in the first direction of movement.

2. The end effector support of claim 1, further comprising a base plate to which the two base rails are secured.

3. The end effector support of claim 1, wherein the two base rails are configured such that the end effector returns to a neutral position relative to the first direction of movement under gravity.

4. The end effector support of claim 1, wherein the two compliance rails are disposed vertically below the two base rails.

5. The end effector support of claim 1, further comprising a lock mechanism to selectably lock the position of the compliance rails relative to the respective base rails.

6. The end effector support of claim 1, where the position sensor is one of a rotary sensor detecting a rotation of a pivot joint connecting the end effector to the base rail or a linear sensor detecting a relative motion of a compliance rail of the two compliance rails with respect to a complimentary base rail of the two base rails.

7. The end effector support of claim 1, further comprising a second compliance mechanism including:
- two upper rails, a first upper rail of the two upper rails offset from a second upper rail of the two upper rails in a second direction of movement of the end effector, each upper rail having an identical curvilinear profile;
- two lower rails, each lower rail operably connected to a respective base rail of the two upper rails, each lower rail having a complimentary curvilinear profile to each of the upper rails;
- a plurality of rolling elements disposed between each upper rail and each lower rail to operably connect the upper rail to the lower rail;
- wherein each lower rail is pivotably connected to first compliance mechanism to allow for movement of the end effector in the second direction of movement; and
- a second position sensor disposed at the second compliance mechanism to detect a position of the lower rails relative to the respective upper rails.

8. The end effector support of claim 7, wherein the second compliance mechanism is disposed vertically above the first compliance mechanism.

9. The end effector support of claim 7, wherein the second direction of movement is perpendicular to the first direction of movement.

10. The end effector support of claim 1, wherein the two upper rails are configured such that the end effector returns to a neutral position relative to the second direction of movement under gravity.

11. A robotic system, comprising:
- a robot;
- an end effector operably connected to the robot; and
- an end effector support operably connecting the end effector to the robot, including:
  - a first compliance mechanism, including:
    - two base rails, a first base rail of the two base rails offset from a second base rail of the two base rails in a first direction of movement of the end effector, each base rail having a curvilinear profile;
    - two compliance rails, each compliance rail operably connected to a respective base rail of the two base rails, each compliance rail having a complimentary curvilinear profile to each of the base rails;
    - a plurality of rolling elements disposed between each base rail and each compliance rail to operably connect the base rail to the compliance rail; and
    - a position sensor disposed at the first compliance mechanism to detect a position of the compliance rails relative to the respective base rails;
    - wherein each compliance rail is configured to be pivotably connected to the end effector to allow for movement of the end effector in the first direction of movement;
  - wherein a robot position is changed in response to a detected position of the compliance rails relative to the respective base rails.

12. The robotic system of claim 11, wherein the two base rails are configured such that the end effector returns to a neutral position relative to the first direction of movement under gravity.

13. The robotic system of claim 11, wherein the two compliance rails are disposed vertically below the two base rails.

14. The robotic system of claim 11, further comprising a lock mechanism to selectably lock the position of the compliance rails relative to the respective base rails.

15. The robotic system of claim 11, where the position sensor is one of a rotary sensor detecting a rotation of a pivot joint connecting the end effector to the base rail or a linear sensor detecting a relative motion of a compliance rail of the two compliance rails with respect to a complimentary base rail of the two base rails.

16. The robotic system of claim 11, further comprising a second compliance mechanism including:
- two upper rails, a first upper rail of the two upper rails offset from a second upper rail of the two upper rails in a second direction of movement of the end effector, each upper rail having an identical curvilinear profile;
- two lower rails, each lower rail operably connected to a respective base rail of the two upper rails, each lower rail having a complimentary curvilinear profile to each of the upper rails;
- a plurality of rolling elements disposed between each upper rail and each lower rail to operably connect the upper rail to the lower rail; and
- a second position sensor disposed at the second compliance mechanism to detect a position of the lower rails relative to the respective upper rails;
- wherein each lower rail is pivotably connected to first compliance mechanism to allow for movement of the end effector in the second direction of movement.

17. The robotic system of claim 16, wherein the second compliance mechanism is disposed vertically above the first compliance mechanism.

18. The robotic system of claim 16, wherein the second direction of movement is perpendicular to the first direction of movement.

19. The robotic system of claim 16, wherein the two upper rails are configured such that the end effector returns to a neutral position relative to the second direction of movement under gravity.

20. The robotic system of claim 16, wherein the end effector is one of a pointer, a sensor probe, a gripper tool, and a welding tool.

* * * * *